United States Patent
Simmons et al.

(10) Patent No.: US 12,489,962 B2
(45) Date of Patent: Dec. 2, 2025

(54) CAMERA MODULE WITH REFLECTIVE COMPONENTS INDEPENDENTLY ELECTRONICALLY CONTROLLABLE TO SWITCH BETWEEN A TRANSMISSIVE STATE AND A REFLECTIVE STATE

(71) Applicant: International Business Machines Corporation, Armonk, NY (US)

(72) Inventors: William James Simmons, Fareham (GB); Nicholas James Daffern, Truro (GB); James Adam Nash, Upminster (GB); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 18/489,112

(22) Filed: Oct. 18, 2023

(65) Prior Publication Data
US 2025/0071404 A1 Feb. 27, 2025

(30) Foreign Application Priority Data
Aug. 24, 2023 (GB) .................................. 2312925

(51) Int. Cl.
*H04N 5/335* (2011.01)
*H04N 23/55* (2023.01)
*H04N 23/82* (2023.01)
*H04N 23/95* (2023.01)

(52) U.S. Cl.
CPC ............ *H04N 23/55* (2023.01); *H04N 23/82* (2023.01); *H04N 23/95* (2023.01)

(58) Field of Classification Search
CPC ...................................................... G03B 17/17
See application file for complete search history.

(56) References Cited

U.S. PATENT DOCUMENTS

| 6,545,741 B2* | 4/2003 | Meltzer ................. G03B 35/18 352/62 |
| 6,751,020 B2* | 6/2004 | Sugawara ............ H04N 13/296 359/464 |

(Continued)

FOREIGN PATENT DOCUMENTS

| GB | 2632852 A | 2/2025 |
| WO | 2021258908 A1 | 12/2021 |
| WO | 2022195099 A1 | 9/2022 |

OTHER PUBLICATIONS

"How Electrochromic Glass Works: The Science Behind SageGlass", Sage Glass, Printed Sep. 7, 2023, 10 pages, <https://www.sageglass.com/smart-windows/how-electrochromic-glass-works>.

(Continued)

*Primary Examiner* — Gary C Vieaux
(74) *Attorney, Agent, or Firm* — Randy Tejeda

(57) ABSTRACT

Embodiments of the present invention provide concepts for camera modules including multiple apertures but only one image sensor for sensing light received via the multiple apertures. In particular, embodiments may provide a camera module including electrically controllable reflective components able to switch between reflective and transmissive states such that light from the apertures may be directed towards the single image sensor or not.

20 Claims, 5 Drawing Sheets

(56) References Cited

U.S. PATENT DOCUMENTS

| | | | |
|---|---|---|---|
| 6,864,910 B1* | 3/2005 | Ogino | H04N 13/211 |
| | | | 348/42 |
| 11,025,886 B2 | 6/2021 | Lo | |
| 11,106,047 B2* | 8/2021 | Wippermann | G02B 26/0816 |
| 2013/0258152 A1* | 10/2013 | Balannik | H04N 13/211 |
| | | | 348/340 |
| 2014/0055624 A1 | 2/2014 | Gaines | |
| 2014/0071329 A1 | 3/2014 | Richardson | |
| 2015/0092102 A1 | 4/2015 | Chan | |
| 2016/0006914 A1 | 1/2016 | Neumann | |
| 2020/0057310 A1* | 2/2020 | Wippermann | H04N 23/55 |
| 2021/0116791 A1 | 4/2021 | Kang | |
| 2022/0109784 A1 | 4/2022 | Vanblon | |
| 2023/0007996 A1 | 1/2023 | Amit | |

OTHER PUBLICATIONS

"Multi-camera smartphones: Benefits and challenges". DXOMARK, Printed Sep. 7, 2023, 11 pages, <https://www.dxomark.com/multi-camera-smartphones-benefits-and-challenges/>.

"Switchable Mirror / Switchable Glass", Kent Optronics, Printed Sep. 7, 2023, 4 pages, <http://kentoptronics.com/mirror.html>.

Gallagher, William, "Periscope lens coming for iPhone 15 Pro", Apple Insider, Jul. 14, 2022, 13 pages, <https://appleinsider.com/articles/22/07/14/periscope-lens-coming-for-iphone-15-pro-may-be-in-all-iphone-16-models>.

Intellectual Property Office, "UK Search Report", Reference No. P202203079GB01, Application No. GB2312925.7, Dated Feb. 23, 2024, 4 pages.

* cited by examiner

CAMERA MODULE WITH REFLECTIVE COMPONENTS INDEPENDENTLY ELECTRONICALLY CONTROLLABLE TO SWITCH BETWEEN A TRANSMISSIVE STATE AND A REFLECTIVE STATE

BACKGROUND

The present invention relates generally to the field of image sensors and more particularly to camera modules including multiple apertures.

Modern smartphones typically have multiple cameras with different lenses to take a greater range of picture types. The purpose is to allow users to take better portrait or landscape photos, wide angle photos, photos with automatic blurring of the background, etc., all with the same phone.

In these arrangements, light is often taken from each lens and mirrored onto individual light sensors to produce an image. This is a simple implementation for allowing multiple camera apertures to be used at the same time, but it also means that multiple sensors are required. This can be costly and increase the area used by camera hardware, especially in relation to thickness, where modern smartphones often have a protruding corner to allow for the camera modules.

Some designs have tried to minimize space by reflecting light to a sensor placed deeper in the device or by having large sensors, but these solutions are costly and/or complex to manufacture.

SUMMARY

The present invention seeks to provide one or more concepts for a camera module. The present invention further seeks to provide a device comprising the proposed camera module. The present invention further seeks to provide one or more concepts for a method for capturing an image using a device comprising an embodiment of the proposed camera module. Such concepts may be computer-implemented. That is, such methods may be implemented in a computer infrastructure having computer executable code tangibly embodied on a computer readable storage medium having programming instructions configured to perform a proposed method. The present invention further seeks to provide a computer readable storage medium including computer program code for implementing the proposed concepts when executed on a processor.

According to an aspect of the present invention there is provided a camera module. The camera module comprises an image sensor having an imaging surface extending in a reference plane, the image sensor being adapted to sense incident light on the imaging surface. The camera module also comprises a light entrance surface extending in a plane that is non-parallel to the reference plane. The camera module further comprises first and second apertures provided in the light entrance surface and associated with first and second different optical pathways, respectively, wherein the first and second optical pathways are incident on the same portion of the imaging surface of the image sensor. The camera module yet further comprises first and second reflective components independently electronically controllable to switch between a transmissive state and a reflective state, the first and second reflective components being positioned along the first and second optical pathways, respectively, wherein, in their reflective states, the first and second reflective components are configured to direct light along the first and second optical pathways respectively, and wherein, in their transmissive states, the first and second reflective components are configured to transmit light through the reflective components respectively along optical pathways different from the first and second optical pathways.

Proposed embodiments may thus provide one or more concepts for a camera module including multiple apertures but using a single image sensor for sensing light received via the multiple apertures, and furthermore, utilizing the same portion of the imaging surface of the image sensor such that the image sensor may be made smaller and more spatially efficient. There is therefore provided a camera module capable of having multiple lenses, each associated with a respective aperture, and a single image sensor, wherein the image sensor does not have to be large to accommodate all the lenses, but rather the light from each lens is directed towards the same portion of the image sensor. This image sensor can then be made as small as possible.

Further, by having the image sensor extending in a plane non-parallel to the plane in which the light entrance surface extends, the camera module may be made slimmer, such that light may be directed sideways towards the image sensor instead of having to travel deeper. In the most optimal embodiment for slimness of the camera module, the light entrance surface can extend in a plane orthogonal to the plane of the image sensor, such that light is reflected at right angles towards the image sensor. The camera module can thus be very shallow.

Further, by using reflective components independently electronically controllable to switch between transmissive and reflective, e.g., a thin film liquid crystal, the optical paths of light from each aperture are able to be quickly and easily controlled whilst also minimizing mechanical parts that may wear down and need to be replaced.

In addition, embodiments of the present invention provide concepts for a device comprising an embodiment of the above-mentioned camera module.

In addition, embodiments of the present invention provide concepts for a computer-implemented method for capturing an image using a device comprising an embodiment of the above-mentioned camera module. The method comprises selecting at least one of the apertures to use as a light source for the image. The method also comprises, responsive to the first aperture being selected, controlling the first reflective component to be in its reflective state and, responsive to the first aperture not being selected, controlling the first reflective component to be in its transmissive state. The method further comprises, responsive to the second aperture being selected, controlling the second reflective component to be in its reflective state and, responsive to the second aperture not being selected, controlling the second reflective component to be in its transmissive state. The method yet further comprises capturing a first image based on incident light on the imaging surface of the image sensor.

In addition, embodiments of the present invention provide concepts for a computer program product comprising one or more computer readable storage medium comprising computing code stored thereon that, when executed, performs an embodiment of the above-mentioned method.

Embodiments may be employed in combination with conventional/existing image capture equipment and/or applications, such as mobile phones and tablet computers (and/or their software applications) for example. In this way, embodiments may integrate into legacy systems to improve and/or extend their functionality and capabilities. An improved image capture/creation device/application may therefore be provided by proposed embodiments.

Thus, there may be proposed concepts for a camera module including a single image sensor and multiple apertures as well as methods for capturing an image using the proposed camera module. The concepts provide one or more approaches to configuring a camera module to have multiple different apertures while also remaining slim and only needing a single image sensor, which can be small as all light is directed towards the same portion of its imaging surface. The controlling and directing of light may be achieved using electronically controllable reflective components such that a number of mechanical parts is reduced.

DETAILED DESCRIPTION

Figure 1:
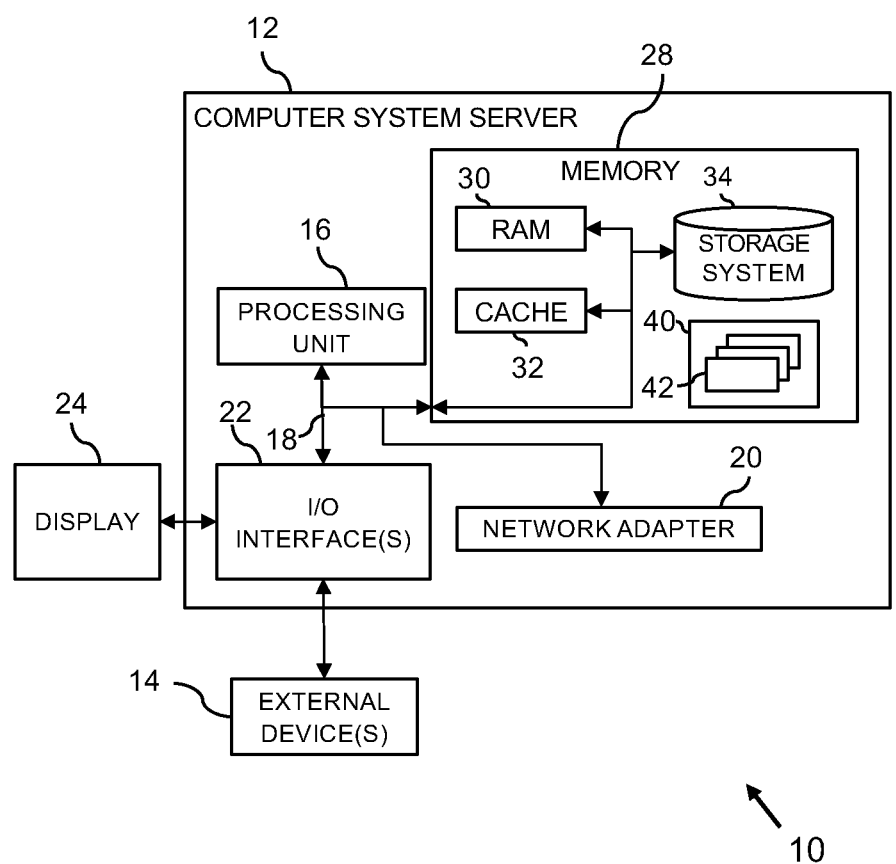
FIG. 1 depicts a computing node according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server, or a collection of PCs and/or servers connected via a network such as a local area network, the Internet, and so on to cooperatively execute at least one embodiment of the methods of the present invention.

The technical character of the present invention generally relates to the field of camera modules, and more particularly, to camera modules including multiple apertures. More specifically, embodiments of the present invention provide concepts for camera modules including multiple apertures but only one image sensor for sensing light received via the multiple apertures.

According to an aspect of the present invention there is provided a camera module. The camera module comprises an image sensor having an imaging surface extending in a reference plane, the image sensor being adapted to sense incident light on the imaging surface. The camera module also comprises a light entrance surface extending in a plane that is non-parallel to the reference plane. The camera module further comprises first and second apertures provided in the light entrance surface and associated with first and second different optical pathways respectively, wherein the first and second optical pathways are incident on the same portion of the imaging surface of the image sensor. The camera module yet further comprises first and second reflective components independently electronically controllable to switch between a transmissive state and a reflective state, the first and second reflective components being positioned along the first and second optical pathways respectively, wherein, in their reflective states, the first and second reflective components are configured to direct light along the first and second optical pathways respectively, and wherein, in their transmissive states, the first and second reflective components are configured to transmit light through the reflective components respectively along optical pathways different from the first and second optical pathways.

Proposed embodiments may thus provide one or more concepts for a camera module including multiple apertures but using a single image sensor, and furthermore, utilizing the same portion of the imaging surface of the image sensor such that the image sensor may be made smaller and more spatially efficient. There is therefore provided a camera module capable of having multiple lenses, each associated with an aperture, and a single image sensor, wherein the image sensor does not have to be large to accommodate all the lenses, but rather the light from each lens is directed towards the same portion of the image sensor. This image sensor can then be made as small as possible.

Further, by having the image sensor extending in a plane non-parallel to the plane in which the light entrance surface extends, the camera module may be made slimmer, such that light may be directed sideways towards the image sensor instead of having to travel deeper. In the most optimal embodiment for slimness of the camera module, the light entrance surface would extend in a plane orthogonal to the plane of the image sensor, such that light is reflected at right angles towards the image sensor. The camera module can thus be very shallow.

Further, by using reflective components independently electronically controllable to switch between transmissive and reflective, e.g., a thin film liquid crystal, the optical path of light from each aperture is able to be quickly and easily controlled whilst also minimizing mechanical parts that may wear down and need to be replaced.

Methods of capturing an image using a device comprising an embodiment of the proposed camera module are also provided. These methods include, essentially, the switching on or off of the reflective components such that light from desired apertures is reflected towards the image sensor and light from undesired apertures is not.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to, microcode, device drivers, redundant processing units, external disk drive arrays, RAID (redundant array of inexpensive disks or redundant array of independent disks) systems, tape drives, and data archival storage systems, etc.

Figure 2:
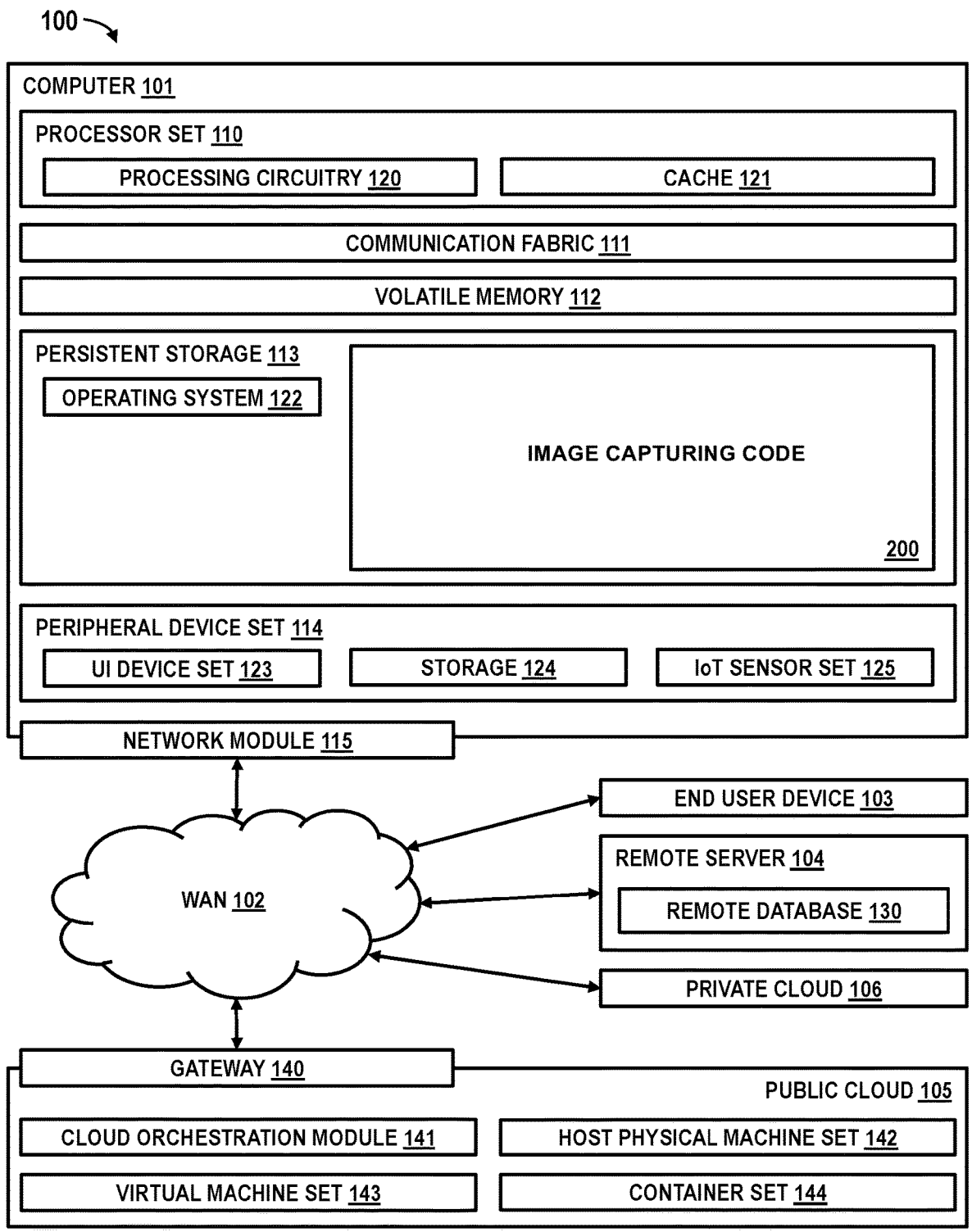
FIG. 2 depicts an illustrative computing environment according to embodiments of the present invention.

Referring now to FIG. 2, an illustrative computing environment 100 is depicted. A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a proposed method for capturing an image using a device comprising an embodiment of the proposed camera module (i.e., image capturing code) 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a camera, smart phone, desktop computer, laptop computer, tablet computer, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 3:
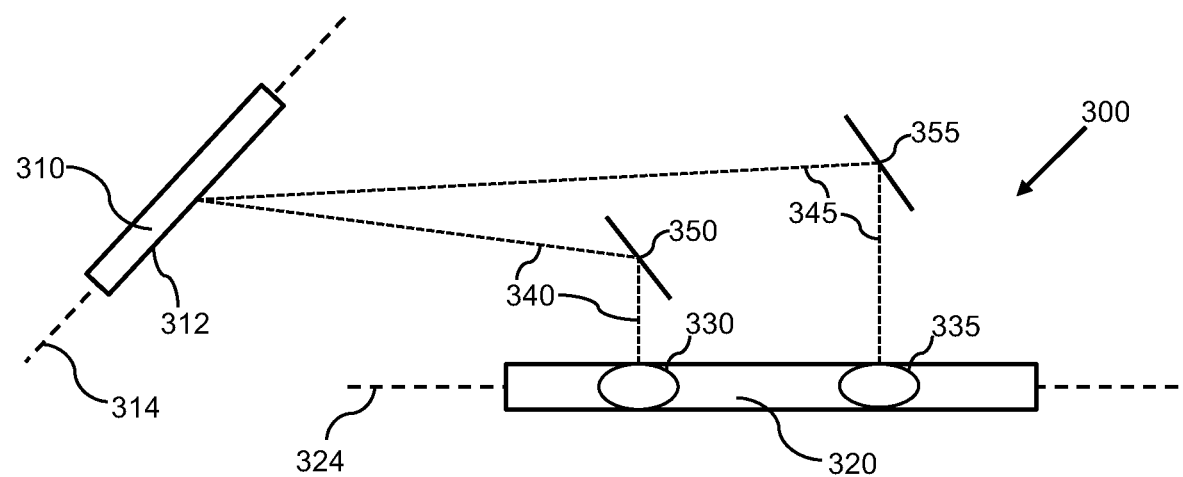
FIG. 3 depicts an illustrative diagram of a camera module according to an embodiment of the present invention.

Referring now to FIG. 3, there is depicted an illustrative diagram of a camera module 300 according to an embodiment of the present invention.

The camera module 300 comprises an image sensor 310 having an imaging surface 312 extending in a reference plane 314, the image sensor being adapted to sense incident light on the imaging surface. The image sensor 310 may comprise any suitable image sensor and can be connected to a camera or device (such as a smartphone, tablet, or smart watch) in a typical manner.

The camera module 300 also comprises a light entrance surface 320 extending in a plane 324 that is non-parallel to the reference plane 314. In this embodiment, the light entrance surface is extending in a plane 324 that is angled at approximately 45 degrees relative to the reference plane 314. In other embodiments, however, it may be angled at any non-zero angle.

First and second apertures, 330 and 335 respectively, are provided in the light entrance surface 320. Apertures may also be understood as viewports or view holes. The apertures may be of the same or different sizes. The first and second apertures, 330 and 335, are associated with first and second different optical pathways, 340 and 345, respectively. The first and second optical pathways, 340 and 345, are incident on the same portion of the imaging surface 312 of the image sensor 310. That is, each aperture, 330 and 335, is associated with an optical pathway, 340 and 345 respectively, that allows light to enter through the aperture and arrive at the same portion of the imaging surface 312 of the image sensor 310. The same portion of the imaging surface 312 can be understood as substantially the same detector pixels of the imaging surface.

To facilitate light travelling along the optical pathways, 340 and 345, first and second reflective components, 350 and 355 respectively, are also provided. The first and second reflective components, 350 and 355, are independently electronically controllable to switch between a transmissive state, wherein light will pass through them, and a reflective state, wherein light will reflect off their surface. The first and second reflective components, 350 and 355, are positioned along the first and second optical pathways, 340 and 345, respectively, such that when they are in their reflective states, the light entering through the apertures is reflected along the first and second optical pathways respectively. That is, the first and second reflective components, 350 and 355, are positioned and angled such that, when reflective, the light entering through each aperture is reflected towards the same portion of the imaging surface 312 of the image sensor 310. Accordingly, when the first and second reflective components, 350 and 355, are in their transmissive states, light entering through the apertures will not be transmitted along their respective optical pathways, 340 and 345, but instead pass through the reflective components, e.g., in a straight line. There is thus provided a way of selectively and independently directing light from each aperture either towards the image sensor 310 or not.

In some embodiments, a non-reflective surface may be positioned behind the reflective components, 350 and 355, such that when either or both are transmissive, and light passes through them, the light is then absorbed by the non-reflective surface. This can then restrict any unwanted light from interfering with light directed towards the light sensor. For example, the non-reflective surface may form part of a camera channel of which the light entrance surface 320 also forms a part. The image sensor 310 could then be positioned at an end of the camera channel. The camera channel may then essentially form a frame for the camera module 300.

The first and second reflective components, 350 and 355, may comprise a thin film liquid crystal that has the property to switch between a reflective and transparent (transmissive) state electronically. In other words, the reflective components can be formed of a thin film liquid crystal that can be designed to fit any size. Alternatively, the reflective components may comprise any suitable material electronically controllable to switch between a reflective and transparent state electronically. It should be noted that when referring to a transmissive (transparent) state, this can be understood as transparent to at least visible light.

Of course, the concepts described in relation to the camera module 300 may be extended to camera modules comprising more than two apertures, for example, three, four, five, six, etc.

Figure 4:
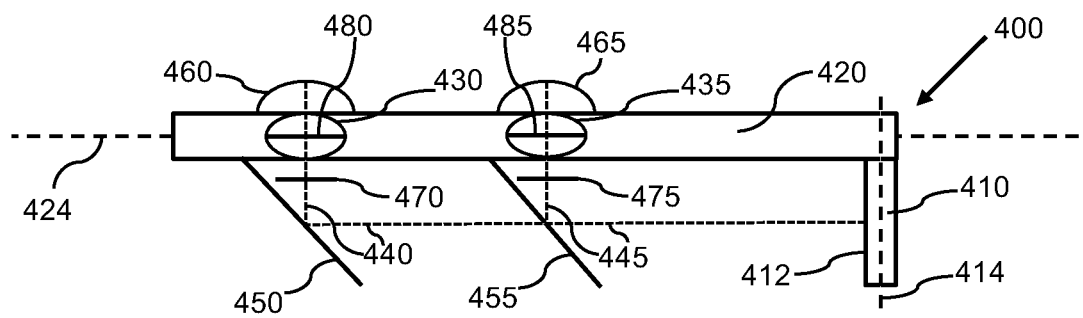
FIG. 4 depicts an illustrative diagram of a camera module according to another embodiment of the present invention.

Turning now to FIG. 4, there is depicted an illustrative diagram of a camera module 400 according to another embodiment of the present invention.

In this embodiment, the light entrance surface 420 extends in a plane 424 that is substantially orthogonal to the reference plane 414 in which the imaging surface 412 of the image sensor 410 is extending. In other words, the light entrance surface 420 is extending in a direction perpendicular to the imaging surface 412 of the image sensor 410. This allows the camera module 400 to be shallower than if the light entrance surface were extending in a direction less than ninety degrees with respect to the imaging surface 414, and thus the camera module 400 may be integrated into slimmer devices, such as a thinner smartphone.

In this embodiment, first and second lenses, 460 and 465 respectively, are positioned on the first and second optical pathways, 440 and 445, respectively. More specifically, in this embodiment, the first and second lenses, 460 and 465, are positioned upstream of the first and second apertures, 430 and 435, on the first and second optical pathways, 440 and 445, respectively. Having a lens before an aperture is typical in camera modules and allows the light to be affected and/or focused before entering the module, however, in other embodiments, the lenses, 460 and 465, may be positioned after the apertures, 430 and 435, along the first and second optical pathways, 440 and 445.

Further, in this embodiment, the first and second lenses, 460 and 465, are different from one another. In this way, a camera module is provided with different lenses, and therefore capable of taking different types of photos, but still while only having one image sensor 410 and also while remaining shallow. In other embodiments, however, the lenses may be the same, for instance, to facilitate 3D images or images wherein each aperture is associated with a different filter.

In other embodiments, further lenses may be positioned along the first and second optical pathways, 440 and 445, respectively such that better optical zoom may be facilitated as well as ensuring that focal lengths between the first and second lenses, 460 and 465, and the imaging surface 412 respectively are optimal.

In this embodiment, first and second filters, 470 and 475 respectively, are also provided, configured to solely filter light transmitted through the first and second apertures, 430 and 435, respectively. In this embodiment, the filters, 470 and 475, are different to one another, however, this need not be the case, i.e., they may be the same as one another. For example, each of the filters, 470 and 475, may comprise a bandpass filter and/or a polarizing filter. The bandpass filter can comprise a filter for a wavelength of visible, infrared, or ultraviolet light. In other embodiments, the filter may comprise any desired filter and not restricted to either of a bandpass or polarizing filter. In other embodiments, only one of the filters, 470 and 475, may be present.

In this embodiment, there are also provided first and second optical components, 480 and 485. The first and second optical components, 480 and 485, are positioned along the first and second optical pathways, 440 and 445, respectively and are independently electronically controllable to switch between a transmissive state and a reflective or opaque state. In this embodiment, the first and second optical components, 480 and 485, are positioned upstream of the first and second reflective components, 450 and 455, along the first and second optical pathways, 440 and 445, respectively, however, this need not be the case. Specifically, in this embodiment, the first and second optical components, 480 and 485, are placed within the first and second apertures, 430 and 435, respectively.

The first and second optical components, 480 and 485, are configured such that, when in their transmissive states, light is transmitted through the optical components along the first and second optical pathways, 440 and 445, respectively, and, when in their reflective or opaque states, light is directed along optical pathways different from the first and second optical pathways, i.e., either reflected away or absorbed. The first and second optical components, 480 and 485, thus essentially act as electronically controllable non-mechanical shutters for the first and second apertures, 430 and 435, respectively, such that when light from one aperture is not desired to be imaged, the light can be restricted from entering the camera module 400.

The first and second optical components, 480 and 485, may comprise the same material as the reflective components, such as a thin film liquid crystal, such that the optical components can switch between a reflective and a transmissive state. Alternatively, the optical components, 480 and 485, may comprise electrochromic glass that can be electronically controlled to switch between a transparent and an opaque state. In some embodiments, the opaque state may not be fully opaque but instead merely less transparent than the transparent state, e.g., tinted and/or frosted. Alternatively, the optical components, 480 and 485, may comprise fog-able glass or any suitable material able to electronically switch between a transmissive and an opaque or reflective state.

In this embodiment, as the second reflective component 455 is positioned along the first optical pathway 440, the second reflective component may be switched to its transmissive state when light from the first aperture 430 is desired to be imaged. Alternatively, the second reflective component 455, in its reflective state, can be configured to act as a one-way mirror such that light from the second aperture 435 is reflected, while light from the first aperture 430 can still pass through.

The concepts described in relation to the camera component 400 can, of course, be extended to camera modules comprising more than two apertures, 430 and 435, for example, three, four, five, six apertures, etc.

In addition, embodiments of the present invention provide concepts for a device comprising an embodiment of the camera modules, 300 and 400, described above. In some embodiments, the device comprises at least one of a camera, a smartphone, a table, a smartwatch, and a computer.

Figure 5:
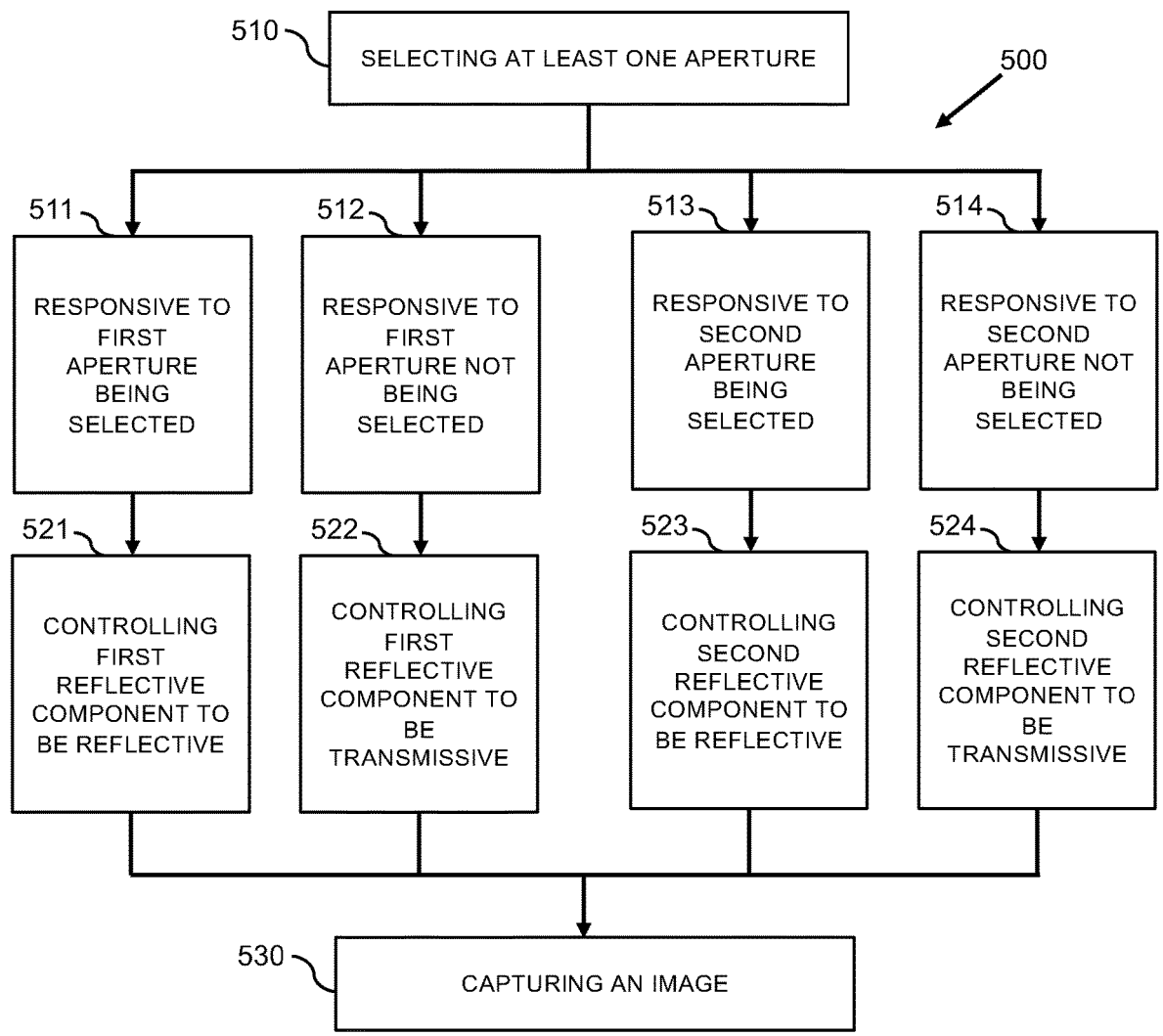
FIG. 5 is a simplified flow diagram of a method for capturing an image according to an embodiment of the present invention.

Turning now to FIG. 5, there is depicted a simplified flow diagram of a method 500 for capturing an image, using a device comprising any herein described embodiment of the proposed camera module, according to an embodiment of the present invention.

The method 500 begins with step 510 of selecting at least one of the apertures to use as a light source for the image. This can be done by a user via software or hardware, such as a physical switch, or it may be done automatically by software. The user may initiate the method 500 for capturing an image by pressing a software button or a hardware button. Responsive to the first aperture being selected 511, the first reflective component is controlled to be in its reflective state 521. Responsive to the first aperture not being selected 512, the first reflective component is controlled to be in its transmissive state 522. Responsive to the second aperture being selected 513, the second reflective component is controlled to be in its reflective state 523. Responsive to the second aperture not being selected 514, the second reflective component is controlled to be in its transmissive state 524. Thus, when capturing an image, either of the apertures may be used or both. A first image is then captured in step 530 based on incident light on the imaging surface of the image sensor, which of course, is determined by the controlling of the first and second reflective components.

In embodiments in which the camera module comprises first and second optical components, steps 521-524 further comprise additional steps to allow light from the selected apertures to reach the imaging sensor and to restrict light from non-selected apertures from reaching the imaging sensor. For example, step 521 further comprises controlling the first optical component to be in its transmissive state; step 522 further comprises controlling the first optical component to be in its reflective or opaque state; step 523 further comprises controlling the first optical component to be in its transmissive state; and step 524 further comprises controlling the second optical component to be in its reflective or opaque state. In other words, in this way, the bleeding of unwanted light is minimized.

Some devices use processing to combine images from different lenses to create desirable effects and this can also be achieved with the present invention. A set of images, each with light from only one aperture (each containing a different lens), can be taken in quick succession and then processed in software to create a final image. The process of taking each individual 'sub-image' is performed according to method 500, with a subsequent processing step after each sub-image has been captured to generate a final combined image based on each of the sub-images. Any number of apertures, and therefore lenses, may be used in a method such as this accordingly. Lens selection may be driven by a user or may be performed automatically by the device. For instance, if the device recognizes that the apertures can see two objects, one in the distance and one close-up, then sub-images using a small and large aperture lens may be captured respectively and then combined into a final combined image in which both the near and far objects are in focus.

In embodiments in which the camera module comprises two or more different bandpass filters, each positioned to filter light from only one aperture, it would be possible to use the above-mentioned method of combining multiple 'sub-images' to produce a spectrogram of a subject of the images (as each sub-image would contain light of only a subset of wavelengths). This could be useful for research purposes, consumer use, or to be leveraged as data by a further application of a device. An example application would be leveraging the spectrogram data in order to better identify plants or the condition of plants.

In embodiments in which the camera module comprises at least one polarizing filter, an image could be taken through water in order to better see the bottom of a lake or swimming pool, for example. A polarizing filter can be used for this as it reduces glare and reflections on the surface of water. For instance, a device may automatically select the aperture associated with an optical pathway including a polarizing filter if it detects that a picture of water is being taken. This may be used standalone for either artistic purposes or to be leveraged in order to aid in the retrieval of objects from water without the need for specialized equipment. For example, the above-mentioned method of combining multiple 'sub-images', one using a polarizing filter and one not, can be used to produce a final combined image in which water in the image is transparent (i.e., consisting of polarized light) but the rest of the image consists of unpolarized light.

The concepts described in relation to method 500 can, of course, be extended to capturing an image using an embodiment of a proposed camera module comprising more than two apertures, for example, three, four, five, six apertures, etc.

Figure 6:
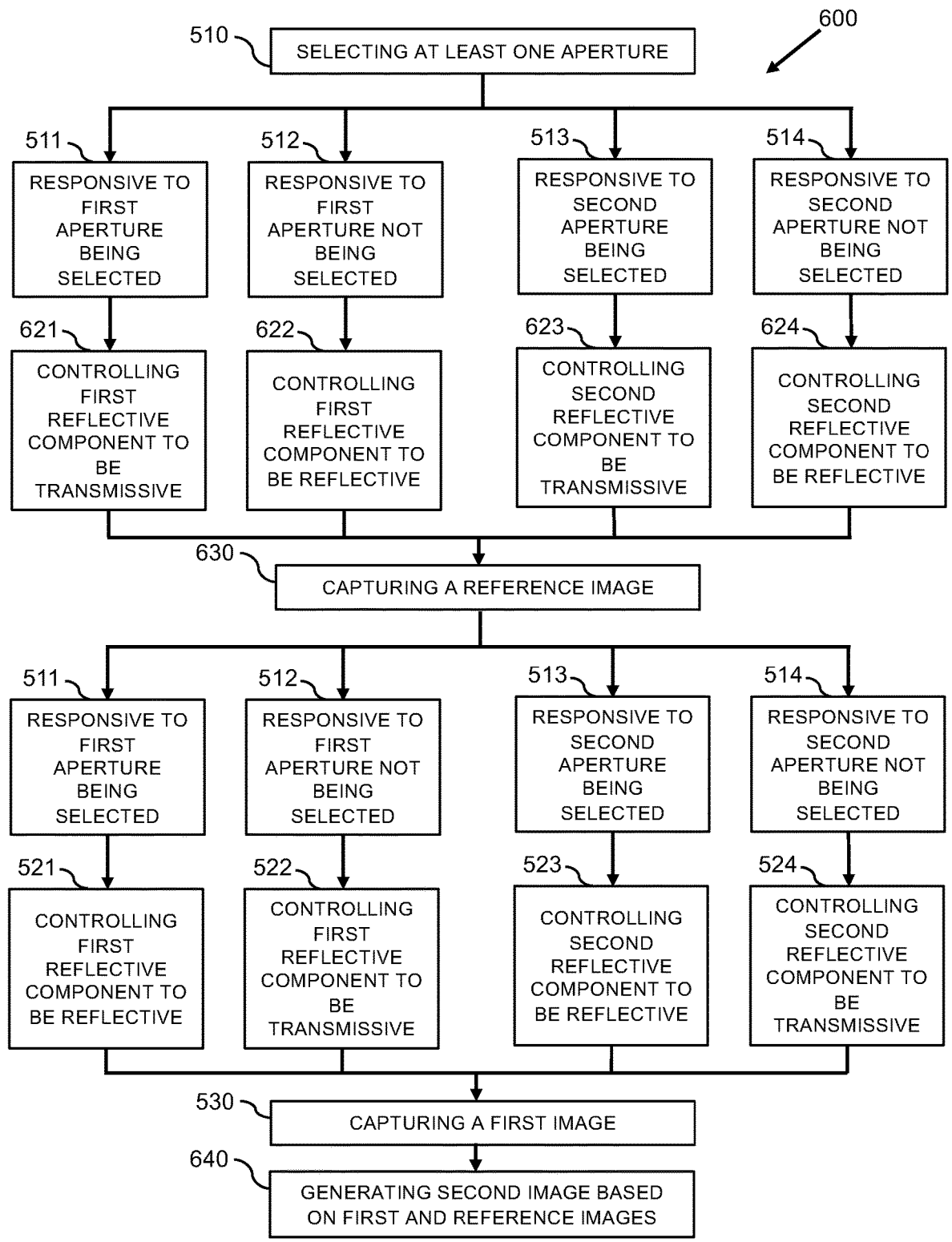
FIG. 6 is a flow diagram of a method for capturing an image according to another embodiment of the present invention.

Turning now to FIG. 6, there is depicted a flow diagram of a method 600 for capturing an image, using a device comprising any herein described embodiment of the proposed camera module, according to an embodiment of the present invention.

The method 600 is essentially the same as method 500 described in relation to FIG. 5, however, it comprises extra steps both before and after steps 511-530. The method 600 begins with step 510 of selecting at least one of the apertures to use as a light source for the image. Responsive to the first aperture being selected 511, the first reflective component is controlled to be in its transmissive state 621. Responsive to the first aperture not being selected 512, the first reflective component is controlled to be in its reflective state 622. Responsive to the second aperture being selected 513, the second reflective component is controlled to be in its transmissive state 623. Responsive to the second aperture not being selected 514, the second reflective component is controlled to be in its reflective state 624. Essentially, the states of the reflective components are switched to be the inverse of that of steps 521-524. A reference image is then captured 630 based on incident light on the image surface of the image sensor.

Similarly to in method 500, in embodiments in which the camera module comprises first and second optical components, steps 621-624 further comprise additional steps, though inverse to those described above, i.e., to allow light from non-selected apertures to reach the imaging sensor and to restrict light from selected apertures from reaching the imaging sensor. For example, step 621 further comprises controlling the first optical component to be in its reflective or opaque state; step 622 further comprises controlling the first optical component to be in its transmissive state; step 623 further comprises controlling the first optical component to be in its reflective or opaque state; and step 624 further comprises controlling the second optical component to be in its transmissive state.

The method 600 then continues with steps 511-530, described in relation to method 500. After capturing the first image 530, however, a second image is then generated in step 640 based on the first image and reference image. For example, step 640 can be used to accommodate for light leakage through the non-selected apertures. For example, step 640 may comprise removing a multiple of the reference image from the first image to generate the second image. In other words, according to the quality of the equipment, some multiple of the reference photo can be removed from the first image, i.e., the actual photo, in order to generate a second image, i.e., an enhanced photo. This can be done by generating partial bitmasks for the R, G, and B color channels and then applying these masks to the first image. Some calibration may be needed to calculate the multiplicative factor of the reference image to remove from the first image. This could be done on a per device or per model basis depending on the desired accuracy. The calibration could be done against standard images in different light levels to work out the correct factor to remove. Alternatively, or in addition, this factor could be calculated as a function of the (ambient) brightness, as it is unlikely that unwanted light will vary non-linearly with brightness. The device could therefore base the multiplicative factor on a brightness reading taken before or during the capture of an image.

It should be noted that in modern smartphones, a preview of the image to be captured/taken is often presented to a user. Therefore, in order to present a preview of an enhanced image to the user (i.e., the second image), the aforementioned loop of events, i.e., method 600, is performed continuously even when the user has not initiated actually taking a photo. In other words, method 600 may be performed continuously such that the user may be provided a preview of the second image before deciding whether to capture the image or not.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It should now be understood by those of skill in the art, in embodiments of the present invention, the proposed concepts provide numerous advantages over conventional camera modules. These advantages include only needing one image sensor, which may have a small imaging surface, even with two or more apertures.

In still further advantages to a technical problem, the processes described herein provide a computer-implemented method for capturing an image using any herein described embodiment of the proposed camera module. In this case, a computer infrastructure, such as the computer system shown in FIGS. 1 and 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 2, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A camera module comprising:
    an image sensor having an imaging surface extending in a reference plane, the image sensor being adapted to sense incident light on the imaging surface;
    a light entrance surface extending in a plane that is non-parallel to the reference plane;
    first and second apertures provided in the light entrance surface and associated with first and second different optical pathways respectively, wherein the first and second optical pathways are incident on a same portion of the imaging surface of the image sensor; and
        first and second reflective components independently electronically controllable to switch between a first transmissive state and a first reflective state, the first and second reflective components being positioned along the first and second optical pathways respectively;
        wherein, in the first reflective state, the first and second reflective components are configured to direct light along the first and second optical pathways respectively; and
        wherein, in the first transmissive state, the first and second reflective components are configured to transmit light through the first and second reflective components respectively along optical pathways different from the first and second optical pathways.

2. The camera module of claim 1, wherein the plane that the light entrance surface extends is substantially orthogonal to the reference plane.

3. The camera module of claim 1, further comprising first and second lenses positioned on the first and second optical pathways respectively.

4. The camera module of claim 3, wherein the first and second lenses are positioned upstream of the first and second apertures on the first and second optical pathways respectively.

5. The camera module of claim 3, wherein the first and second lenses are different from one another.

6. The camera module of claim 1, further comprising a first filter configured to solely filter light transmitted through the first aperture.

7. The camera module of claim 6, further comprising a second filter configured to solely filter light transmitted through the second aperture.

8. The camera module of claim 6, wherein a filter comprises a bandpass filter or a polarizing filter.

9. The camera module of claim 1, further comprising first and second optical components independently electronically controllable to switch between a second transmissive state and a second reflective state, the first and second optical components being positioned along the first and second optical pathways respectively;
    wherein, in the second transmissive state, the first and second optical components are configured to transmit light through the first and second optical components along the first and second optical pathways respectively; and
    wherein, in the second reflective state, the first and second optical components are configured to direct light along optical pathways different from the first and second optical pathways.

10. The camera module of claim 9, wherein the first and second optical components are positioned upstream of the first and second reflective components along the first and second optical pathways respectively.

11. A computer-implemented method for capturing an image using a device comprising a camera module, the computer-implemented method comprising:
    selecting at least one of first and second apertures of the camera module to use as a light source for the image, wherein the camera module comprises:
        an image sensor having an imaging surface extending in a reference plane, the image sensor being adapted to sense incident light on the imaging surface;
        a light entrance surface extending in a plane that is non-parallel to the reference plane;
        the first and second apertures provided in the light entrance surface and associated with first and second different optical pathways respectively, wherein the first and second optical pathways are incident on a same portion of the imaging surface of the image sensor; and
        first and second reflective components independently electronically controllable to switch between a first transmissive state and a first reflective state, the first and second reflective components being positioned along the first and second optical pathways respectively;
        wherein, in the first reflective state, the first and second reflective components are configured to direct light along the first and second optical pathways respectively; and
        wherein, in the first transmissive state, the first and second reflective components are configured to transmit light through the first and second reflective components respectively along optical pathways different from the first and second optical pathways;
    if the first aperture is selected, controlling the first reflective component to be in a reflective state;
    if the first aperture is not selected, controlling the first reflective component to be in the first transmissive state;
    if the second aperture is selected, controlling the second reflective component to be in the first reflective state;
    if the second aperture is not selected, controlling the second reflective component to be in the first transmissive state; and
    capturing a first image based on incident light on the imaging surface of the image sensor.

12. The computer-implemented method of claim 11, further comprising:
    prior to any aforementioned steps of controlling:
        responsive to the first aperture being selected, controlling the first reflective component to be in the first transmissive state;
        responsive to the first aperture not being selected, controlling the first reflective component to be in the first reflective state;
        responsive to the second aperture being selected, controlling the second reflective component to be in the first transmissive state;
        responsive to the second aperture not being selected, controlling the second reflective component to be in the first reflective state; and
        capturing a reference image based on the incident light on the imaging surface of the image sensor; and
    after capturing the first image, generating a second image based on the first image and reference image.

13. The computer-implemented method of claim 11, further comprising:
responsive to the first aperture being selected, controlling a first optical component to be in a second transmissive state, wherein the camera module further comprises the first optical component and a second optical component independently electronically controllable to switch between the second transmissive state and a second reflective state, the first and second optical components being positioned along the first and second optical pathways respectively, wherein, in the second transmissive state, the first and second optical components are configured to transmit light through the first and second optical components along the first and second optical pathways respectively, and wherein, in the second reflective state, the first and second optical components are configured to direct light along optical pathways different from the first and second optical pathways;
responsive to the first aperture not being selected, controlling the first optical component to be in the second reflective state;
responsive to the second aperture being selected, controlling the second optical component to be in the second transmissive state; and
responsive to the second aperture not being selected, controlling the second optical component to be in the second reflective state.

14. The computer-implemented method of claim 13, further comprising:
prior to any aforementioned steps of controlling:
responsive to the first aperture being selected, controlling the first reflective component to be in the first transmissive state and controlling the first optical component to be in the second reflective state;
responsive to the first aperture not being selected, controlling the first reflective component to be in the first reflective state and controlling the first optical component to be in the second transmissive state;
responsive to the second aperture being selected, controlling the second reflective component to be in the first transmissive state and controlling the second optical component to be in the second reflective state;
responsive to the second aperture not being selected, controlling the second reflective component to be in the first reflective state and controlling the second optical component to be in the second transmissive state; and
capturing a reference image based on incident light on the imaging surface of the image sensor; and
after capturing the first image, generating a second image based on the first image and the reference image.

15. The computer-implemented method of claim 14, wherein generating the second image based on the first image and the reference image comprises:
removing a multiple of the reference image from the first image to generate the second image.

16. A computer program product comprising:
one or more computer readable storage media and program instructions collectively stored on the one or more computer readable storage media, wherein the computer readable storage media are not a transitory signal per se, the stored program instructions comprising:
program instructions to select at least one of first and second apertures of a camera module to use as a light source for an image, wherein the camera module comprises:
an image sensor having an imaging surface extending in a reference plane, the image sensor being adapted to sense incident light on the imaging surface;
a light entrance surface extending in a plane that is non-parallel to the reference plane;
the first and second apertures provided in the light entrance surface and associated with first and second different optical pathways respectively, wherein the first and second optical pathways are incident on a same portion of the imaging surface of the image sensor; and
first and second reflective components independently electronically controllable to switch between a first transmissive state and a first reflective state, the first and second reflective components being positioned along the first and second optical pathways respectively;
wherein, in the first reflective state, the first and second reflective components are configured to direct light along the first and second optical pathways respectively; and
wherein, in the first transmissive state, the first and second reflective components are configured to transmit light through the first and second reflective components respectively along optical pathways different from the first and second optical pathways;
if the first aperture is selected, program instructions to control the first reflective component to be in a reflective state;
if the first aperture is not selected, program instructions to control the first reflective component to be in the first transmissive state;
if the second aperture is selected, program instructions to control the second reflective component to be in the first reflective state;
if the second aperture is not selected, program instructions to control the second reflective component to be in the first transmissive state; and
program instructions to capture a first image based on incident light on the imaging surface of the image sensor.

17. The computer program product of claim 16, further comprising:
prior to any aforementioned program instructions to control:
responsive to the first aperture being selected, program instructions to control the first reflective component to be in the first transmissive state;
responsive to the first aperture not being selected, program instructions to control the first reflective component to be in the first reflective state;
responsive to the second aperture being selected, program instructions to control the second reflective component to be in the first transmissive state;
responsive to the second aperture not being selected, program instructions to control the second reflective component to be in the first reflective state; and
program instructions to capture a reference image based on the incident light on the imaging surface of the image sensor; and after capturing the first image, program instructions to generate a second image based on the first image and reference image.

18. The computer program product of claim 16, further comprising:
responsive to the first aperture being selected, program instructions to control a first optical component to be in a second transmissive state, wherein the camera module further comprises the first optical component and a second optical component independently electronically controllable to switch between the second transmissive state and a second reflective state, the first and second optical components being positioned along the first and second optical pathways respectively, wherein, in the second transmissive state, the first and second optical components are configured to transmit light through the first and second optical components along the first and second optical pathways respectively, and wherein, in the second reflective state, the first and second optical components are configured to direct light along optical pathways different from the first and second optical pathways;
responsive to the first aperture not being selected, program instructions to control the first optical component to be in the second reflective state;
responsive to the second aperture being selected, program instructions to control the second optical component to be in the second transmissive state; and
responsive to the second aperture not being selected, program instructions to control the second optical component to be in the second reflective state.

19. The computer program product of claim 18, further comprising:
prior to any aforementioned program instructions to control:
responsive to the first aperture being selected, program instructions to control the first reflective component to be in its transmissive state and controlling the first optical component to be in its reflective or opaque state;
responsive to the first aperture not being selected, program instructions to control the first reflective component to be in its reflective state and controlling the first optical component to be in its transmissive state;
responsive to the second aperture being selected, program instructions to control the second reflective component to be in its transmissive state and controlling the second optical component to be in its reflective or opaque state;
responsive to the second aperture not being selected, program instructions to control the second reflective component to be in its reflective state and controlling the second optical component to be in its transmissive state; and
program instructions to capture a reference image based on incident light on the imaging surface of the image sensor; and
after capturing the first image, program instructions to generate a second image based on the first image and reference image.

20. The computer program product of claim 19, wherein the program instructions to generate the second image based on the first image and the reference image comprise:
program instructions to remove a multiple of the reference image from the first image to generate the second image.

* * * * *